(12) United States Patent
Jan et al.

(10) Patent No.: US 6,710,003 B2
(45) Date of Patent: Mar. 23, 2004

(54) PROCESS FOR PREPARING ATTRITION RESISTANT ZEOLITIC LAYERED CATALYST COMPOSITION

(75) Inventors: Deng-Yang Jan, Elk Grove Village, IL (US); James F. Mc Gehee, Milan (IT); Guy B. Woodle, Mount Prospect, IL (US); Masao Takayama, Isehara (JP); Raelynn M. Miller, LaGrange, IL (US)

(73) Assignee: UOP LLC, Des Plaines, IL (US)

( * ) Notice: Subject to any disclaimer, the term of this patent is extended or adjusted under 35 U.S.C. 154(b) by 109 days.

(21) Appl. No.: 10/022,024

(22) Filed: Dec. 13, 2001

(65) Prior Publication Data

US 2002/0049132 A1 Apr. 25, 2002

Related U.S. Application Data

(60) Division of application No. 09/603,769, filed on Jun. 26, 2000, now Pat. No. 6,376,730, which is a continuation-in-part of application No. 09/185,189, filed on Nov. 3, 1998, now Pat. No. 6,177,381.

(51) Int. Cl.[7] .......................... B01J 29/04; B01J 29/06; B01J 29/18; B32B 17/02; B32B 15/02
(52) U.S. Cl. ............................. 502/60; 502/63; 502/78; 502/79; 502/73; 502/350; 428/403
(58) Field of Search ............................. 502/63, 78, 79, 502/73, 350, 60; 428/403

(56) References Cited

U.S. PATENT DOCUMENTS

| | | | |
|---|---|---|---|
| 2,620,314 A | 12/1952 | Hoekstra | 252/448 |
| 3,145,183 A | 8/1964 | Fisher | 252/477 |
| 3,274,124 A | 9/1966 | O'Hara | 252/451 |
| 3,558,477 A | 1/1971 | Kluksdahl | 208/138 |
| 3,562,147 A | 2/1971 | Pollitzer et al. | 208/139 |
| 3,584,060 A | 6/1971 | Rausch | 260/669 |
| 3,632,503 A | 1/1972 | Hayes | 208/139 |
| 3,649,566 A | 3/1972 | Hayes et al. | 252/470 |
| 3,682,838 A | 8/1972 | Bloch | 252/464 |
| 3,755,481 A | 8/1973 | Hayes | 260/668 D |
| 3,761,531 A | 9/1973 | Bloch | 260/668 D |
| 3,878,131 A | 4/1975 | Hayes | 252/466 PT |
| 3,897,368 A | 7/1975 | Ohara et al. | 252/466 PT |

(List continued on next page.)

FOREIGN PATENT DOCUMENTS

WO    WO 98/14274    4/1998

OTHER PUBLICATIONS

Excerpt from *Heterogeneous Catalysis in Practice* by Charles N. Satterfield, McGraw–Hill Book Company, 1980, pp. 151–153, no month available.

Primary Examiner—Elizabeth D. Wood
Assistant Examiner—Patricia L. Hailey
(74) Attorney, Agent, or Firm—John G. Tolomei; Frank S. Molinaro

(57) ABSTRACT

A layered catalyst composition is disclosed where the composition is prepared by bonding an outer layer comprising a bound zeolite (e.g. zeolite beta) to an inner core material (e.g. cordierite). The use of an organic bonding agent in the catalyst preparation procedure provides a composition that is sufficiently resistant to mechanical attrition to be used commercially in aromatic alkylation processes (e.g. benzene alkylation to ethylbenzene). Advantages associated with the use of layered compositions include a significant reduction in the amount of zeolite used for a given reactor loading and improved selectivity to desired alkylated aromatic products. Further benefits are realized when the layered composition is formed into shapes having a sufficiently high void volume to reduce pressure drop across the alkylation catalyst bed. This is especially relevant for operation involving high recycle rates and consequently low alkylating agent concentrations in the reaction zone. Such conditions are known to promote reduced byproduct formation.

12 Claims, 4 Drawing Sheets

Layered Catalyst Attrition vs. Zeolite Layer Thickness

U.S. PATENT DOCUMENTS

| | | | |
|---|---|---|---|
| 3,909,450 A | 9/1975 | O'Hara | 252/438 |
| 3,951,860 A | 4/1976 | Acres et al. | 252/432 |
| 4,008,290 A | 2/1977 | Ward | 260/672 T |
| 4,051,191 A | 9/1977 | Ward | 260/671 R |
| 4,077,912 A | 3/1978 | Dolhyj et al. | 252/461 |
| 4,255,253 A | 3/1981 | Herrington et al. | 208/216 PP |
| 4,283,583 A * | 8/1981 | Velenyi et al. | 585/467 |
| 4,440,871 A | 4/1984 | Lok et al. | 502/214 |
| 4,482,774 A | 11/1984 | Koetsier | 585/481 |
| 4,483,940 A | 11/1984 | Ono et al. | 502/159 |
| 4,567,029 A | 1/1986 | Wilson et al. | 423/306 |
| 4,686,202 A | 8/1987 | Broecker | 502/300 |
| 4,701,436 A | 10/1987 | Wang et al. | 502/339 |
| 4,716,143 A | 12/1987 | Imai | 502/326 |
| 4,786,625 A | 11/1988 | Imai et al. | 502/326 |
| 4,793,984 A | 12/1988 | Lok et al. | 423/306 |
| 4,868,148 A | 9/1989 | Henk et al. | 502/303 |
| 4,988,659 A | 1/1991 | Pecoraro | 502/235 |
| 5,164,350 A | 11/1992 | Abe et al. | 502/66 |
| 5,179,054 A | 1/1993 | Schipper et al. | 502/67 |
| 5,286,699 A | 2/1994 | Ohata et al. | 502/304 |
| 5,407,880 A | 4/1995 | Ikeda et al. | 502/67 |
| 5,504,051 A | 4/1996 | Nakamura et al. | 502/261 |
| 5,516,740 A | 5/1996 | Cody et al. | 502/204 |
| 5,763,351 A | 6/1998 | Ichimura | 502/303 |
| 5,811,064 A | 9/1998 | Kojima et al. | 422/180 |
| 5,877,370 A | 3/1999 | Gajda | 585/467 |
| 5,895,769 A * | 4/1999 | Lai | 502/4 |
| 6,013,851 A | 1/2000 | Verrelst et al. | 585/533 |
| 6,022,825 A | 2/2000 | Andersen et al. | 502/303 |
| 6,177,381 B1 * | 1/2001 | Jensen et al. | 502/325 |
| 6,376,730 B1 * | 4/2002 | Jan et al. | 585/467 |

* cited by examiner

PROCESS FOR PREPARING ATTRITION RESISTANT ZEOLITIC LAYERED CATALYST COMPOSITION

CROSS-REFERENCE TO RELATED APPLICATIONS

This application is a divisional of U.S. application Ser. No. 09/603,769 filed on Jun. 26, 2000 now U.S. Pat. No. 6,376,730 which in turn is a continuation-in-part of U.S. Application Ser. No. 09/185,189 filed on Nov. 3, 1998 now U.S. Pat. No. 6,177,381 B1 all of which are incorporated by reference in their entirety.

FIELD OF THE INVENTION

The present invention relates to a novel aromatic alkylation process using the a layered catalyst composition. The layered composition comprises an inner core such as cordierite, and an outer layer comprising a bound zeolite that is bonded to the inner core. The outer layer is bonded to the inner core using an organic bonding agent such as polyvinyl alcohol, so that the resulting layered composition is sufficiently attrition resistant for use in commercial aromatic alkylation processes.

BACKGROUND OF THE INVENTION

The alkylation of aromatic hydrocarbons such as benzene using solid catalysts is a well-developed art that is practiced commercially in large scale industrial units. One commercial application of this process is the alkylation of benzene with ethylene to produce ethyl benzene, which is subsequently used to produce styrene. Another application is the alkylation of benzene with propylene to form cumene (isopropylbenzene), which is subsequently used in the production of phenol and acetone. Those skilled in the art are familiar with the general design and operation of such alkylation processes. For example, U.S. Pat. No. 4,051,191 depicts a typical flow scheme suitable for the production of cumene. Of course, both the ethyl benzene and cumene production processes have undergone continual improvement since their commercial introduction.

The performance of aromatic alkylation processes is influenced to a significant extent by the activity and selectivity of the catalyst in the operating environment of the process. Currently available catalysts for aromatic alkylation include those having considerable acidity such as aluminum chloride and zeolites. The characterization of solid materials in terms their acidic properties is described in detail in Satterfield, *Heterogeneous Catalysis in Practice*, McGraw-Hill, pp. 151–153. Compared to aluminum chloride, zeolitic catalyst have certain advantages in alkylation processes, such as fewer problems related to corrosion and spent catalyst disposal.

Despite these advantages associated with the use of zeolites, however, there is also a considerable expense related to loading large quantities of zeolite- (e.g. beta zeolite-) containing catalysts into commercial reactor volumes. Furthermore, due to the nature of aromatic alkylation catalyst deactivation, the initial catalyst loadings in commercial fixed-bed operations generally contain far more zeolite than that which is needed at any given time to catalyze the alkylation reaction. In other words, only a small portion of the active zeolite sites in fresh catalyst loadings is utilized for the desired alkylation reaction, while catalyst beyond the easily recognizable alkylation exotherm is essentially not used for alkylation initially. Moreover, the active acid sites in this downstream portion of the catalyst bed tend to promote undesirable side reactions, such as the formation of oligomers and diphenyl alkanes.

Since an excess of reactive alkylation sites (i.e. the acid sites of the zeolite) are present during most of the catalyst lifetime, the reaction is said to be diffusion limited. The reaction rate is determined not by the absolute number of active sites, but by the rate of diffusion of aromatic compounds (e.g. benzene) and alkylating agents (e.g. ethylene) to these sites. The excess reactive sites become utilized only gradually as the catalyst deactivates and as the alkylation zone and consequently the catalyst bed exotherm migrate toward the reactor outlet.

To better utilize the active sites of the zeolite and thus conserve the total amount of this expensive catalyst component required for a commercial loading, the prior art has recognized that coating an inert core with a shell or layer of zeolitic material is desirable. For example, U.S. Pat. No. 4,283,583 teaches that a coated catalyst improves aromatic alkylation process economics, since only a fraction of the zeolite otherwise needed is loaded. Further advantages with this mode of operation include the reduction of byproduct make and increase in catalyst activity per gram of active component (i.e. zeolite).

The teachings of the '583 patent and other prior art (e.g. U.S. Pat. Nos. 4,077,912 and 4,255,253), however, fail to explain a way to coat the base support material that results in a layered catalyst composition able to withstand prolonged exposure to commercial aromatic alkylation conditions without significant attrition. For example, the coated catalyst preparation method described in the '583 patent involves wetting a base support material and rolling this support in zeolite powder. Furthermore, the use of atmospheric pressure and consequently essentially gas-phase processing conditions are taught in the '583 patent and other references. In contrast, commercial alkylation technologies, including the above-mentioned ethylbenzene and cumene production processes are performed most economically at pressures sufficient to cause the reactants to be substantially liquid phase. Under these conditions, a strong bond between the outer, zeolitic layer and core material is critical to prevent elution or erosion of the outer layer into process streams. The fact that benzene and other aromatics used in the liquid feed to such processes are notably strong solvents further emphasizes the importance, in using a layered catalyst, of having a strong, attrition resistant bond between the outer layer and core.

U.S. Pat. No. 5,516,740 discloses coating an inert core with a slurry of catalytically active ingredients and a boehmite/pseudo boehmite solvent. After the coating step, the resulting particles are calcined to convert the boehmite to gamma alumina and provide a bond between the inner inert core and outer active components. The present invention, however, does not rely solely on a boehmite slurry to provide 1) the binding of the outer layer of catalytically active ingredients and 2) the bond between the outer layer and the inner core. Rather, applicants have found superior results related to both of these functions through the use of an additional organic bonding agent. The '740 patent further discloses that the catalyst is used in an isomerization process.

U.S. Pat. No. 6,013,851 and U.S. Pat. No. 4,482,774 are directed to inner core materials that are limited to zeolites and crystalline materials, respectively. In the '851 patent, the catalyst is prepared by heating a synthesis mixture having crystals of the core zeolite dispersed therein. Likewise, the catalyst of the '774 patent is made by heating a solution having preformed particles of the core material (in this case crystalline silica, e.g. silicalite) contained therein. Here, the solution contains a silica source for a modified silica, an organic template, a source of a modifying element, and an alkali. The catalyst used in the hydrocarbon conversion process of the '874 patent comprises a crystalline modified-silica zeolite overlying a silica core having substantially the same crystalline structure as the modified-silica zeolite. Among other differences, the catalyst used in the aromatic alkylation process of the present invention has an inner core that is not necessarily a crystalline material.

Finally, published application WO 98/14274 A1 provides a preparation technique for a shell material that is deposited onto and bonded with a (preferably inert) core material. The thin shell is formed by a deposition process that involves repeatedly applying and drying small quantities of a slurry containing the shell material. The slurry can be in the form of a colloidal dispersion, or sol. The catalyst particles formed may be used for a wide variety of chemical reactions including alkylation.

In contrast to the prior art, applicants have developed a layered catalyst composition for the alkylation of aromatic hydrocarbons that differs from the prior art in several respects. The composition comprises an inner core such as cordierite and an outer layer comprising a bound zeolite. The outer layer is bonded to the inner core such that the attrition loss is less than about 25% of the weight of the outer layer. This attrition resistant catalyst is prepared using an organic bonding agent such as polyvinyl alcohol that increases the bond between the layer and the inner core, allowing sustained use of the layered composition under commercial alkylation conditions.

As stated above, the catalyst of the present invention, based on its improved strength and bonding characteristics, is suitable for alkylation processes, and especially those where the alkylation reaction takes place substantially in the liquid phase. The advantages associated with using an improved, attrition resistant, layered catalyst formulation in an aromatics alkylation process, however, are not limited to the aforementioned reduced expenditure on zeolite, higher selectivity to alkyl aromatics, and more efficient catalyst utilization.

It is also an important consideration that a layered catalyst composition can assume a variety of possible shapes, (e.g. rings) because, in many cases, the inner core material (e.g. cordierite) is commercially available in several physical forms. Layered compositions, therefore, provide vastly greater possibilities than the uniform zeolite catalysts in terms of their physical form. This is evident because the zeolite itself, either alone or in combination with a binder, cannot be fabricated into the types of thin-walled structures obtainable as a deposited layer on an inner core, without compromising strength properties to the extent that the catalyst would be unfit for the alkylation reaction environment. In particular, the ability to use catalyst shapes having a sufficiently high bed voidage (i.e. greater than about 0.35) associated with rings and other shapes favorably impacts the pressure drop across the alkylation zone. Hence, the pumping energy requirement associated with recycling a portion of the alkylation reactor effluent back to the reactor inlet is reduced, resulting in further economic advantages. The use of high recycle operation (i.e. greater than about 3:1 by weight of reactor effluent to fresh feed) is beneficial for several reasons.

To illustrate the importance of recycling alkylation zone effluent, the prior art has recognized that minimizing the concentration of the alkylating agent (e.g. propylene) in the alkylation reaction zone further reduces the formation of undesirable byproducts. In this regard, U.S. Pat. No. 4,008,290 teaches that, as a result of suppressing the reactor inlet propylene concentration in a cumene production process, the formation of propylene oligomers is limited and the reaction exotherm is reduced. The latter effect additionally lowers the productivity of byproducts that normally result from a high temperature rise across the alkylation zone or zones. Likewise, U.S. Pat. No. 5,877,370 recognizes that the byproduct 1,1 diphenylethane (1,1-DPE) concentration is decreased in an ethylbenzene production process when the reaction zone ethylene concentration is lowered.

SUMMARY OF THE INVENTION

In one embodiment, the present invention is a process for the alkylation of an aromatic hydrocarbon feed stream to yield an alkylated aromatic product, the process comprising contacting the feed stream with an alkylating agent at alkylation conditions in the presence of a layered composition comprising an inner core, an outer layer bonded to the inner core such that the attrition loss is less than about 25% of the weight of the outer layer, and the outer layer comprising a zeolite and a binder.

In a second embodiment, the present invention is a process for the alkylation of an aromatic hydrocarbon feed stream, the process comprising forming a combined stream comprising the feed stream, a recycle portion of an alkylation zone effluent stream, and an alkylating agent; alkylating the combined stream in an alkylation zone at alkylation conditions, the alkylation zone containing a layered composition catalyst comprising an inner core, an outer layer bonded to the inner core such that the attrition loss is less than about 25% of the weight of the outer layer, and the outer layer comprising a zeolite and a binder; recovering from the alkylation zone the alkylation zone effluent; separating a product portion of the alkylation zone effluent into a low-boiling fraction comprising benzene, a product stream comprising an alkylated aromatic product, and a high boiling fraction comprising polyalkylated aromatic compounds; and transalkylating at least a portion of the low-boiling fraction and at least a portion of the high boiling fraction in a transalkyation zone containing a transalkylation catalyst at transalkylation conditions.

In another embodiment, the present invention is a process as described above where the combined stream is substantially a liquid at alkylation conditions.

In yet another embodiment the present invention is a process for preparing a layered catalyst composition comprising an inner core, an outer layer bonded to the inner core, the outer layer bonded to the inner core such that the attrition loss is less than 25% of the weight of the outer layer, and the outer layer comprising a zeolite and a binder, the process comprising coating the inner core with a slurry comprising the zeolite, a sol of the binder, and an organic bonding agent, to yield a coated core having the outer layer, drying the coated core at a temperature from about 20° C. to about 250° C. to yield a dried coated core, and calcining the dried coated core at a temperature from about 400° C. to about 900° C. for a time sufficient to bond the outer layer to the inner core and provide the layered catalyst composition.

In a final embodiment the present invention is the product of the process described above.

DETAILED DESCRIPTION OF THE INVENTION

Figure 1:
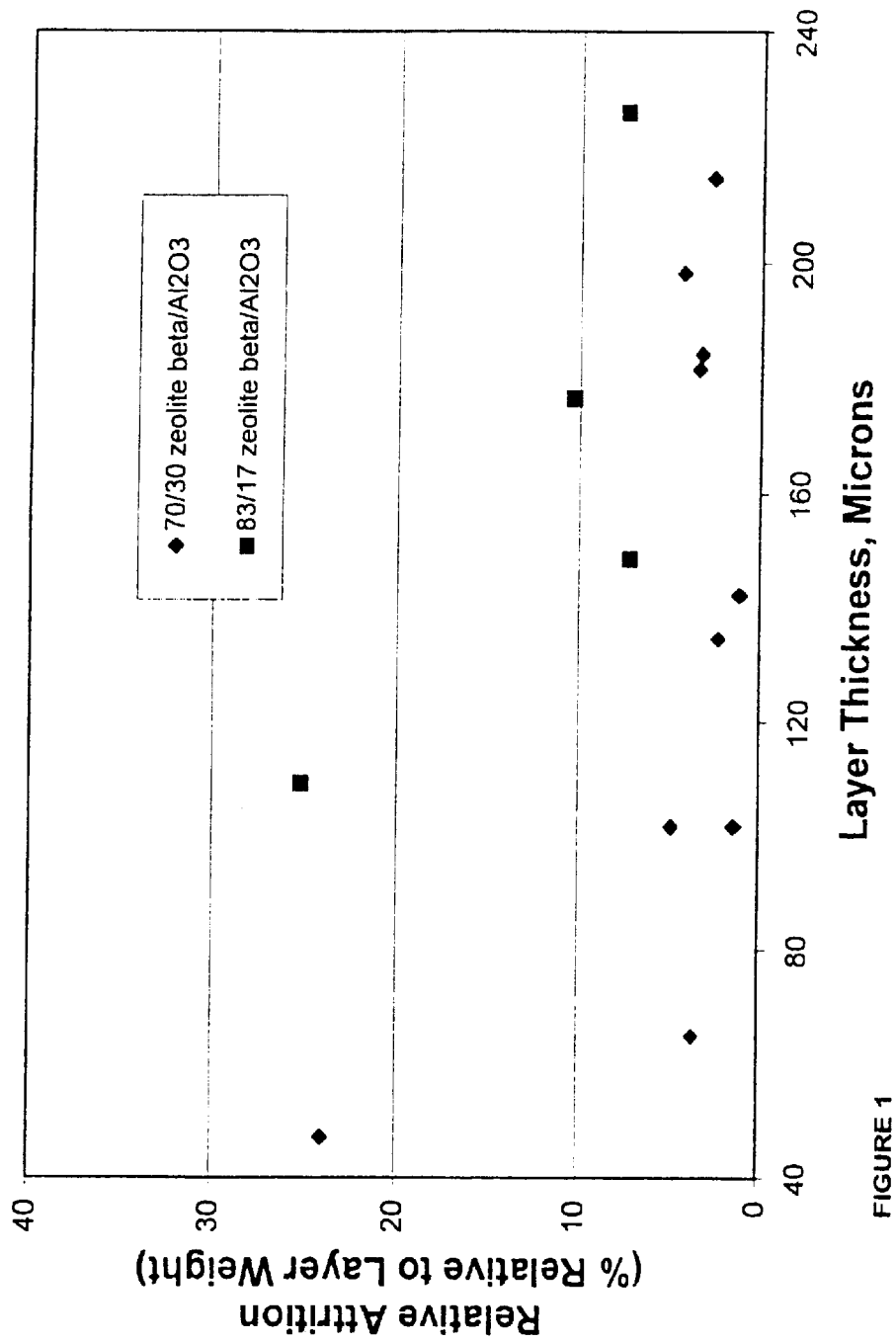
FIG. 1 provides relative attrition data for two distinct outer layer zeolite/binder ratios at varying layer thicknesses, where the layered compositions were prepared using an organic bonding agent.

As stated, the present invention relates to an aromatic alkylation process using a layered catalyst composition. The layered catalyst composition comprises an inner core composed of a material that has substantially lower catalytic activity for the desired alkylation reaction, relative to the outer layer. The inner core may therefore be essentially inert in the alkylation environment, or it may possess activity for functions complementing alkylation. For instance, it is contemplated that the core material could contain a moderate amount of acidity to promote the adsorption of basic impurities (e.g. morpholine) or the transalkyation of polyalkylated reaction products with feed aromatics to yield monoalkylates. Of course, any type of inner core material must have the capability to withstand the alkylation reaction conditions without thermal or mechanical degradation. The characteristics of the inner core must also be properly matched with those of the outer layer, such that a strong, attrition resistant bond is formed during the composition preparation steps outlined hereinafter.

Examples of the inner core materials that are essentially inert include, but are not limited to, refractory inorganic oxides, silicon carbide, and metals. Examples of refractory inorganic oxides include without limitation cordierite, alpha alumina, theta alumina, magnesia, zirconia, titania and mixtures thereof. A preferred inorganic oxide is cordierite. Examples of acidic inner core materials found to be effective for the adsorption of basic impurities include, but are not limited to, commercially available clays such as montmorillonite, saponite, kaolinite, and bentonite. These clays can be used as mined in their natural state, or they may also be employed in highly active forms, typically activated by an acid treatment procedure. Commercial suppliers of these clays include American Colloidal Co. (Arlington Heights, Ill.), GSA Resources, Inc. (Tuscon, Ariz.), Albion Kaolin Co. (Hephzibah, Ga.), and others. Examples of acidic inner core materials found to be effective in the reaction environment of the present invention for promoting transalkylation reactions include zeolites such as faujasite, mordenite, and others.

The materials that form the inner core can be formed into a variety of shapes such as pellets, extrudates, spheres, rings, trilobes, saddles, or other physical forms known in the art. Of course, not all materials can be formed into each shape. Preparation of the inner core can be done by means known in the art such as oil dropping, pressure molding, metal forming, pelletizing, granulation, extrusion, rolling methods and marumerizing. A spherical inner core is commonly used, although pressure drop considerations can warrant the use of shaped articles that result in a higher void fraction when such shapes are packed into a catalyst bed. The inner core whether spherical or not has an effective diameter of about 0.05 mm to about 5 mm and preferably from about 0.4 mm to about 3 mm. For a non-spherical inner core, effective diameter is defined as the diameter the shaped article would have if it were molded into a sphere. Once the inner core is prepared, it is calcined at a temperature of about 400° C. to about 1500° C.

The inner core is now coated with a layer comprising a zeolite that is active as a catalyst in the aromatic alkylation process of the present invention. Examples of zeolites that are particularly suited for this purpose include, but are not limited to, zeolite beta, zeolite MWW, zeolite Y (both cubic and hexagonal forms), zeolite X, mordenite, zeolite L, zeolite ferrierite, MFI, and erionite. Zeolite beta is especially preferred and is described in U.S. Pat. No. 3,308,069 according to its structure, composition, and preferred methods of synthesis. Y zeolites are broadly defined in U.S. Pat. No. 3,130,007, which also includes synthesis and structural details. Mordenite is a naturally occurring siliceous zeolite which can have molecular channels defined by either 8 or 12 member rings. Donald W. Breck describes the structure and properties of mordenite in *Zeolite Molecular Sieves* (John Wiley and Sons, 1974, pp. 122–124 and 162–163). Zeolite L is defined in U.S. Pat. No. 3,216,789, which also provides information on its unique structure as well as its synthesis details. Other examples of zeolites that can be used are those having known structure types, as classified according to their three-letter designation by the Structure Commission of the International Zeolite Association ("Atlas of Zeolite Structure Types", by Meier, W. M.; Olsen, D. H; and Baerlocher, Ch., 1996) of MFI, FER, ERI, and FAU. Zeolite X is a specific example of the latter structure type that may be used in the present invention. The zeolite structure type MWW, approved by the Structure Commission on Apr. 30, 1997, is also suitable.

The outer layer is applied by forming a slurry of the zeolite powder and then coating the inner core with the slurry by means well known in the art. To form a layered composition in which the outer layer is a zeolite bound with an inorganic metal oxide, the slurry will contain an appropriate sol, or carrier material, of the binder used for suspending the zeolite. In the case of incorporating alumina, silica, magnesia, zirconia, or titania binders into the zeolite for producing the outer layer of the composition, it is appropriate to use a hydrosol. For example, any of the transitional aluminas can be mixed with water and an acid such as nitric, hydrochloric, or sulfuric to give an aluminum sol. Alternatively, an aluminum sol can be made by for example, dissolving aluminum metal in hydrochloric acid and then mixing the aluminum sol with the alumina powder. When an alumina binder is desired, it is also possible to use a solution of boehmite or aluminum nitrate in place of the aluminum sol.

Types of silica sols used to form a silica bound zeolite are commercially available as aquasols or organosols containing dispersed colloidal silica particles. Otherwise, a silica gel may also be used to ultimately form a silica binder in the zeolitic outer layer. If a magnesia binder is desired, the starting slurry will contain hydrolyzed magnesium alkoxide. When a zirconia binder is used for the outer layer preparation, the preferred starting acidic sol is an aqueous zirconium acetate solution, which is preferably combined with a urea gelling agent. When a titania binder is used, the acidic sol is preferably a solution of titanyl oxychloride, which is also preferably combined with a urea gelling agent. The amount sol added to the slurry is based on typical binder contribution from about 10% to about 50% of the weight of the bound zeolite forming the outer layer of the composition. Those skilled in the art will readily appreciate the relationship between the zeolite:sol weight ratio of the slurry and the concentration of binder in the resulting outer layer.

It is also required that the slurry contain an organic bonding agent that 1) aids in the adhesion of the layer material (i.e. the bound zeolite) to the inner core and 2) improves the overall strength of the outer layer zeolite/binder system. Examples of this organic bonding agent include but are not limited to polyvinyl alcohol (PVA), hydroxy propyl cellulose, methyl cellulose, and carboxy methyl cellulose. The amount of organic bonding agent which is added to the slurry will vary considerably from about 0.1% to about 5% by weight of the slurry. How strongly the outer layer is bonded to the inner core can be measured by the amount of layer material lost during an attrition test, i.e., attrition loss. Loss of the zeolitic outer layer by attrition is measured by agitating the catalyst, collecting the fines and calculating an attrition loss. It has been found that by using an organic bonding agent as described above, the attrition loss is less than about 25% by weight of the outer layer. In most cases, this attrition loss is less than 10%.

Depending on the particle size of the zeolitic outer layer, it may be necessary to mill the slurry in order to reduce the particle size and simultaneously give a narrower particle size distribution. This can be done by means known in the art such as ball milling for times of about 30 minutes to about 5 hours and preferably from about 1.5 to about 3 hours. It is believed that using a slurry with a particle size distribution that has been adjusted in this manner improves the bonding of the outer layer to the inner core. It should also be noted that, in addition to the zeolite powder, sol of the binder, and bonding agent, the slurry will contain a balance of de-ionized water. The amount of water is often adjusted after any milling operation in order to obtain a viscosity of the slurry in the range from about 30 to about 600 centipoise.

Without wishing to be constrained by any particular theory, it is believed that the organic bonding agent aids in providing a high-density, mechanically-superior zeolite/binder system that is used to form the outer layer. Furthermore, it appears that bonding agents such as PVA aid in making an interlocking bond between the outer layer material and the inner core. Whether this occurs by the PVA reducing the surface tension of the core or by some other mechanism is not clear. What is clear is that a considerable reduction in loss of the outer layer by attrition is observed. This desirable characteristic, therefore, results from a combination of a structurally improved zeolite/binder system as well as an enhanced bond between the outer layer and inner core, both of which are attributable to the use of the organic bonding agent.

Coating of the inner core with the slurry can be accomplished by means such as rolling, dipping, spraying, etc. to yield a coated core having an outer layer. One preferred coating technique involves using a fixed fluidized bed of inner core particles and spraying the slurry into the bed to coat the particles evenly. The thickness of the layer of the coated core can vary considerably, but usually is from about 5 to about 500 microns, preferably from about 10 to about 300 microns. It should be pointed out that the optimum layer thickness depends on the specific alkylation process in which the catalyst will be used as well as the choice of the outer layer bound zeolite.

Once the inner core is coated with the outer bound zeolite layer, the resultant coated core is dried at a temperature of about 50° C. to about 300° C. for a time of about 1 to about 24 hours to provide a dried coated core. Subsequently, the dried coated core is calcined at a temperature of about 400° C. to about 900° C. for a time of about 0.5 to about 10 hours to effectively bond the outer layer to the inner core and provide the layered catalyst composition of the present invention. The calcination step also removes any remaining organic template material within the zeolite as well as any residual bonding agent. In some cases, the catalyst may be activated in a modified calcination step wherein the organic template is first decomposed in a flow of pure nitrogen. The oxygen concentration is then gradually increased to combust any residual hydrocarbons in the zeolite. It is also possible to combine the drying and calcining operations into a single step.

Having obtained the layered catalyst, it can be used in the aromatic alkylation process of the present invention. Specific alkylation processes for which the layered composition is particularly useful include, but are not limited to, 1) the production of ethyl benzene from benzene and ethylene and 2) the production of cumene from benzene and propylene. As noted, the conditions necessary to carry out alkylation of aromatic compounds are well known and are disclosed, for example, in U.S. Pat. Nos. 3,965,043 and 3,979,331, both of which are incorporated by reference. Generally the process can be carried out in a batch type or a continuous type operation. In a batch type process, the catalyst, aromatic compound, and alkylating agent (e.g. ethylene) are placed in an autoclave capable of maintaining the desired alkylation pressure. An excess amount of aromatic compound should be present, preferably in a range of about 2:1 to about 20:1 moles of aromatic compound per mole of alkylating agent. The reaction is carried out at an elevated temperature since the rate of alkylation is undesirably low at room temperature. Preferably the temperature is in the range of about 40° C. to about 200° C. The process is carried out for a time of about 0.5 to about 4 hours, after which the product is separated from the starting materials by conventional means.

It is preferred to carry out the aromatic alkylation process in a continuous manner, whereby the catalyst is placed in a reactor that is heated and pressurized to the desired operating conditions. The aromatic compound and alkylating agent are contacted in the presence of the layered catalyst composition described above. Alkylation conditions generally include a pressure from about 5 to about 70 atmospheres. In order to maintain the combined feed stream within the alkylation reaction zone in a substantially liquid phase, however, reaction pressures from about 20 to about 60 atmospheres are more commonly used. By substantially liquid phase is meant that the at least about 50% by weight of the combined feed stream is in the liquid phase within the reactor environment and is not vaporized. The combined feed stream includes the reactant streams, namely, the aromatic feed, alkylating agent, and reactor effluent recycle as well as other process streams recycled back to the reactor such as a commonly employed benzene recycle stream. A diluent such as nitrogen that is in the gas phase under ambient conditions and does not participate in the alkylation reaction is not a component of the combined feed stream. To achieve a favorable reaction rate and conversion level, the overall reaction conditions also include a temperature from about 100° C. to about 300° C. and an alkylating agent weight hourly space velocity from about 0.1 to about 3 $hr^{-1}$. As is understood in the art, the alkylating agent weight hourly space velocity is the weight flow of the alkylating agent divided the catalyst bed weight. This term provides a measure of how many equivalent catalyst bed weights of alkylating agent are processed every hour.

As discussed previously, the layered catalyst composition described herein has been found to give exceptional performance characteristics when used for aromatic alkylation. The primary advantage associated with this catalyst composition is overall activity and stability comparable to that obtained using conventional catalysts having a zeolite or bound zeolite distributed throughout each particle. Relative to these non-layered materials, the layered composition of the present invention utilizes significantly less of the expensive zeolite without sacrificing conversion. The fact that catalyst performance does not suffer despite the inner core of the composition having essentially no alkylation activity points to the alkylation reaction being diffusion limited. However, this theory is not meant to pose any limitations on the scope or applicability of the present invention. Of course, the outer layer thickness should not be reduced to the point where active zeolite sites are diluted within the catalyst bed such that the reaction becomes kinetically limited. It has been determined that the desired diffusion limited regime is maintained when the outer layer thickness is from about 10 to about 400 microns. This layer thickness still provides, compared to uniformly composed zeolitic catalysts, a substantial reduction in zeolite used and thus a significant cost savings.

A further benefit of the layered catalyst composition arises from the overall reduction in active sites. The diffusion limited reaction environment theorized above suggests that only a portion of the active sites within the catalyst bed are used at a given time for alkylation. Any excess sites can catalyze non-selective reactions downstream of reactor bed region where aromatic alkylation is essentially complete. A large portion of such excess sites, those normally within the catalyst core, are eliminated using the layered composition of the present invention. Thus, the participation of the aromatic feed stream, alkylating agent, and reaction products thereof in detrimental, non-selective reactions is mitigated. Again, the above explanation poses a theory to explain the superior results obtained using the layered composition of the present invention, without intending to limit it in any way.

In the case of the aromatic alkylation reaction of ethylene with benzene to produce ethylbenzene, non aromatic byproducts such as 1,1 diphenylethane are found to contaminate the aromatic alkylated product. It has been determined that the concentration of these undesired non aromatic species can be reduced using the layered composition rather than the traditional uniform zeolite or uniform bound zeolite catalyst. A preferred mode of implementing the process of the present invention is such that the selectivity to alkylated aromatics is at least about 99%. As understood in the art, this condition refers to the incorporation of at least about 99% of the weight of the converted alkylating agent and aromatic reactants into alkylated aromatics. Alkylated aromatics, although predominately the monoalkylated species (e.g. ethylbenzene), may also take the form of polyalkylates (e.g. diethylbenzene). The polyalkylates are typically converted in the presence of benzene in a second reaction zone (i.e. a transalkylation zone) to the desired monoalkylate product.

In the case of cumene (isopropylbenzene) production from propylene and benzene, a major consideration relating to the production of byproducts due to non-selective reactions is the amount of n-propylbenzene in the alkylated aromatic product. Although n-propylbenzene is in fact an alkylated aromatic compound, its presence to a significant degree in a cumene product stream is problematic in downstream processing to produce phenol. While it is known in the art that n-propylbenzene productivity increases with increasing temperature, it has now been found that the layered catalyst of the present invention directionally lowers the amount of n-propylbenzene in the cumene product stream. In a preferred mode of operating the process of the present invention, therefore, the cumene product stream contains less than about 1000 ppm of n-propylbenzene. Commercially, the reduction in n-propylbenzene productivity allows the cumene producer to operate at a relatively higher temperature using the layered catalyst composition of the present invention, while still maintaining an n-propylbenzene product concentration below a desired level. This ability to increase reaction temperature has a favorable impact on overall catalyst life.

Generally, the process of the present invention comprises the alkylation of an aromatic hydrocarbon feed stream (e.g. benzene) with an alkylating agent (e.g. ethylene). A combined stream of the aromatic hydrocarbon, alkylating agent, and at least a portion (i.e. a recycle portion) of the alkylation reactor effluent are charged to an alkylation zone or reactor under alkylation conditions as defined previously. In addition to the portion of the reactor effluent that is recycled to the alkylation reactor, unreacted benzene that is separated downstream of the alkylation zone may also be returned to the reactor. As mentioned, the alkylation reaction takes place in the presence of a layered catalyst composition of the present invention. From the alkylation zone effluent that is recovered, a product portion is sent for further processing, while the recycle portion is routed back to the alkylation reactor to control the olefin concentration and temperature rise therein. The product portion is then separated into a low-boiling fraction comprising the aromatic hydrocarbon, a product stream comprising alkylated aromatic hydrocarbon (e.g. ethylbenzene), and a high boiling fraction comprising polyalkylated aromatic compounds (e.g. diethylbenzene). As mentioned previously, it is well known that the polyalkylates may be conveniently transalkylated in a transalkylation zone or reactor to significantly improve the yield of the alkylated aromatic hydrocarbon. The transalkylation reaction is effected by contacting the polyalkylate with the aromatic hydrocarbon in the presence of a transalkylation catalyst under transalkylation conditions. Typically, at least a portion of the low-boiling fraction comprising benzene and at least a portion of the high-boiling fraction comprising polyalkylated aromatic compounds are fed to the transalkylation reactor.

In a preferred embodiment, the catalyst used for the transalkylation reactor is a non-layered or conventional uniform zeolitic catalyst composition. Since it has been determined that transkalkylation, in contrast to the alkylation, is not diffusion limited but rather kinetically limited, a layered composition is not recommended for transalkylation. For example, the transalkylation catalyst may comprise alumina-bound zeolite beta without an inner core. Conveniently, the zeolite saved as a result of using a layered catalyst composition in the alkylation reactor can be advantageously used by increasing the size of the uniform catalyst bed in the transalkylation reactor. Suitable transalkylation reactors, conditions, and catalysts are well known in the art.

Overall, the benefits associated with using the layered composition of the present invention are obtained because the composition has the proper structural characteristics to withstand the alkylation reaction environment. This applies especially to current commercial alkylation processes where the reaction takes place substantially in the liquid phase, so that any detrimental leeching, dissolution, mechanical attrition, or other effects associated with the layered catalyst being subjected to continual contact with a liquid stream are of primary importance. The ability to fabricate a structurally stable layered composition also has implications in terms of the potential catalyst shapes that may be formed. The layered compositions of the present invention can assume virtually any of the commercially available or otherwise manufacturable forms of the inner core material. For example, Norton Chemical Process Products Corporation (Akron, Ohio) and CeramTec AG Chemical Applications Division (Marktredwitz, Germany) both offer alpha alumina and other inorganic supports not only in spherical form but also in various pressed and extruded shapes, including rings, half rings, trilobes, saddles, and others. These materials, when used for the inner core of the alkylation catalyst of the present invention, result in a zeolitic catalyst of approximately the same shape. In contrast, uniform zeolite (or uniform bound zeolite) compositions cannot easily be fabricated into shapes other than spheres or extrudates without compromising structural integrity. Furthermore, it is virtually impossible to synthesize a thin-walled zeolitic structure, approximating that deposited onto any of the aforementioned inner core shapes in a layered composition, without severely limiting catalyst crushing strength.

Associated with this flexibility to form a wide variety of catalyst shapes is the ability to conveniently limit the pressure drop across the alkylation reaction zone. In a preferred embodiment of the present invention, for example, the layered composition catalyst in the alkylation zone has a void fraction of at least about 0.35 to reduce this pressure differential. As understood in the art, the catalyst void fraction refers to the amount of space between catalyst particles when loaded into a packed bed, relative to the total bed volume. The void fraction is normally calculated as (1−ABD/PD), where ABD is the average bulk density of the catalyst in the packed bed and PD is the piece density of an average catalyst particle. ABD and PD are expressed in the same unit. A plot of typical bed voidages for rings showing values ranging from 0.53 to 0.75 or more, depending on particle diameter and bed diameter, is contained in "Fluidization" by Max Leva (New York: McGraw-Hill, 1959) at page 54. Directionally, increasing the catalyst void fraction provides a more economical mode of operation in terms of the utility requirements for pumping the reactants through the alkylation zone, especially when high rates of alkylation reactor effluent recycle are utilized.

As explained in U.S. Pat. No. 4,008,290, the advantages associated with recycling this effluent in a process for the production of cumene from benzene and propylene are clarified. Namely, since propylene is substantially converted in the alkylation zone and is thus essentially absent in the reactor effluent, increasing the reactor effluent recycle effectively increases the molar excess of benzene in the reactor charge. This, in turn, decreases the formation of oligomers of the alkylating agent (e.g. hexene produced from the dimerization of propylene) and other undesirable by products resulting from an excessive temperature rise across the alkylation reactor.

Also, U.S. Pat. No. 5,877,370 further clarifies the benefits of maintaining a low concentration of olefinic alkylating agent in the alkylation zone. Specifically, in an ethylbenzene production process from ethylene and benzene, suppressing the ethylene concentration in the alkylation reactor minimizes the formation of the byproduct 1,1 diphenylethane. Combining these teachings, related to byproduct reduction through lowering the reaction zone alkylating agent (e.g. ethylene or propylene) level, with the potentially lower reaction zone pressure drop associated with the novel layered catalyst composition, makes the present invention especially applicable to operation at a low reactor alkylating agent concentration.

Preferably, the alkylating agent comprises at most 2% of the weight of the combined feed stream, which is defined as explained previously. Generally, it is desirable to operate at a high rate of reactor effluent recycle to achieve this alkylating agent concentration. On a weight flow basis, the portion of the reactor effluent recycled back to the reactor inlet is preferably at least about three times as great as the other streams contributing to the combined feed stream. Stated otherwise, the recycle portion of the alkylation zone effluent preferably comprises at least about 75% of the weight of the combined feed stream. Furthermore, operation at high recycle rates can achieve the desired 1,1 diphenylethane concentration in the ethylbenzene product stream, as set forth in the '370 patent, of less than about 1% by weight relative to ethylbenzene.

The following examples are presented in illustration of this invention and are not intended as undue limitations on the generally broad scope of the invention as set forth in the appended claims.

EXAMPLE 1

A layered catalyst composition was synthesized according to the present invention. A solution of polyvinyl alcohol (PVA) bonding agent (20% by weight), aluminum sol (20% by weight), and de-ionized water (balance) was prepared and mixed for 15 minutes. A pre-weighed amount of zeolite beta powder having an average crystallite size of approximately 0.04 microns was blended into this solution and the resulting slurry was stirred for 15 minutes. The amount of zeolite beta used was based on obtaining an final outer layer comprising 70% by weight zeolite and 30% by weight alumina binder, resulting from the incorporation of aluminum sol. A more uniform composition was obtained by ball milling the slurry for two hours, after which the viscosity was adjusted to about 100 centipoise by adding a further amount of de-ionized water.

A fixed fluidized bed of spherical cordierite inner core particles having an average diameter of about 1.6 mm were then sprayed with the slurry to provide an even coating. After the coating step, the material was dried at a temperature of 100° C. and thereafter calcined at 350° C. for one hour and at 630° C. for two hours in flowing air prior to use in an aromatic alkylation process. The calcination step served to remove remaining organic template and PVA, as well as to convert the alumina sol into gamma alumina. Very good layer physical strength, as determined by subjecting the resulting layered composition to an attrition test, was achieved using this preparation method. A relative attrition value of less than 2% was observed for a layered composition with an outer layer thickness of about 50 microns.

EXAMPLE 2

Using the preparation method described in Example 1, several layered compositions comprising an inner core of cordierite and an outer layer of 70 weight-% zeolite beta and 30 weight-% alumina binder were synthesized. Various layer thicknesses were obtained by adjusting the coating conditions and the amount of coating slurry used. Each of the layered compositions obtained was measured for relative attrition to determine the relationship between structural integrity and outer layer thickness. The test for the loss of layer thickness by attrition involved first placing a sample of the composition in a vial and in turn placing the vial alongside two other vials containing the same amount of sample. The vials were milled for 10 minutes and removed from the blender. The contents of the vials were then sieved to separate the powder from the spheres. The powder was weighed and an attrition loss, measured in percent by weight based on the outer layer, was calculated.

Several additional layered compositions, but having an outer layer comprising 83 weight-% zeolite beta and 17 weight-% alumina binder, were also prepared and measured for relative attrition of the outer layer. Results are depicted graphically in FIG. 1 for those samples having an outer layer thickness of at least about 50 microns. The data show that a relative attrition value of less than about 25%, based on the weight of the outer layer, was consistently attained using the preparation procedure of the present invention. In most cases the relative attrition value was less than 10% by weight, relative to the outer layer.

EXAMPLE 3

The preparation method described in Example 1 was used to make a layered catalyst composition where the outer layer comprised about 70% by weight zeolite beta bound with about 30% by weight of alumina. The thickness of the outer layer was determined to be approximately 25 microns. Similar to the composition produced in Example 1, the inner core material was cordierite and the organic bonding agent was polyvinyl alcohol.

Figure 2:
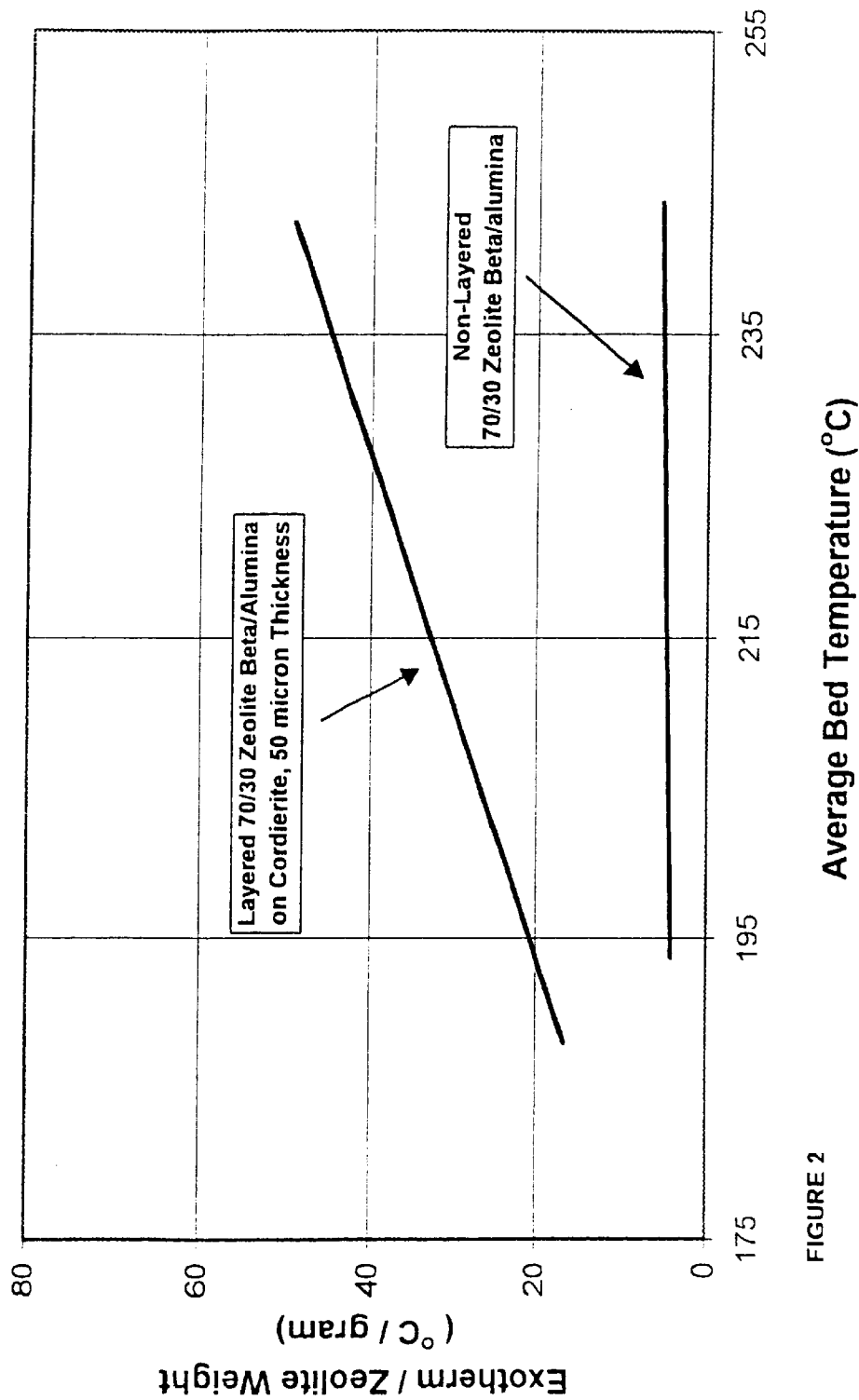
FIG. 2 graphically illustrates the benefit that the layered composition provides in terms of catalyst effectiveness, based on zeolite utilization.

The layered composition was tested for its activity in the alkylation of benzene with ethylene to produce ethylbenzene. A 40 ml sample of the layered composition was loaded into a 22 mm i.d. steel reactor. During the test, the benzene was introduced and conditions of pressure and temperature within the reactor as described previously for aromatic alkylation were established. Ethylene was then introduced to the inlet of the reactor, along with a recycle stream of product effluent used to control the olefin content prior to reaction. The test data gathered included the measurement of the reaction exotherm, or the difference between the peak and inlet reactor temperatures, at varying inlet temperatures. The location of the peak reactor temperature in each case was presumed to signify the point where the exothermic alkylation reaction was essentially complete. The weight of the zeolite actually utilized in the reactor to achieve this peak temperature (and essentially complete conversion) was calculated based on the peak temperature location and reactor loading characteristics (i.e. zeolite loading density). Catalyst effectiveness was determined based on the ratio of the exotherm to the weight of zeolite required to reach the peak reactor temperature. The relationship between catalyst effectiveness (based on zeolite utilization) and the average overall catalyst bed temperature is depicted in FIG. 2.

EXAMPLE 4

A prior art commercial catalyst was tested in the pilot-scale benzene alkylation process described in Example 3. The catalyst was in this case not a layered composition but rather comprised uniformly mixed zeolite beta and binder in a ratio of approximately 70/30 by weight. This conventional catalyst exhibited an almost identical temperature profile, including the peak temperature and location, to that found for the layered composition catalyst of Example 4. While the same reactor volume was needed in each case to reach the catalyst peak temperature, the layered composition required less than 10% of the amount of zeolite to achieve essentially complete conversion. Thus, the layered composition of the present invention demonstrated a significantly improved effectiveness in terms of zeolite beta utilization, as shown in FIG. 2. This characteristic of the layered catalyst translates into a significant economic advantage, since the amount of zeolite required for performance comparable to that of conventional catalysts can be reduced by about 90% or more, based on this example. Of course, the reduction in zeolite will vary depending upon the specific process and conditions in which the layered composition of the present invention is used.

EXAMPLE 5

Using the preparation method described in Example 1, a layered composition comprising an inner core of cordierite and an outer layer of 70 weight-% zeolite beta and 30 weight-% alumina binder was synthesized and tested in the pilot scale benzene alkylation process described in Example 3. The test extended for over 200 hours without any appreciable change in the magnitude or location of the reaction exotherm. This example shows a high level of activity stability for the layered catalyst composition of the present invention.

EXAMPLE 6

Figure 3:
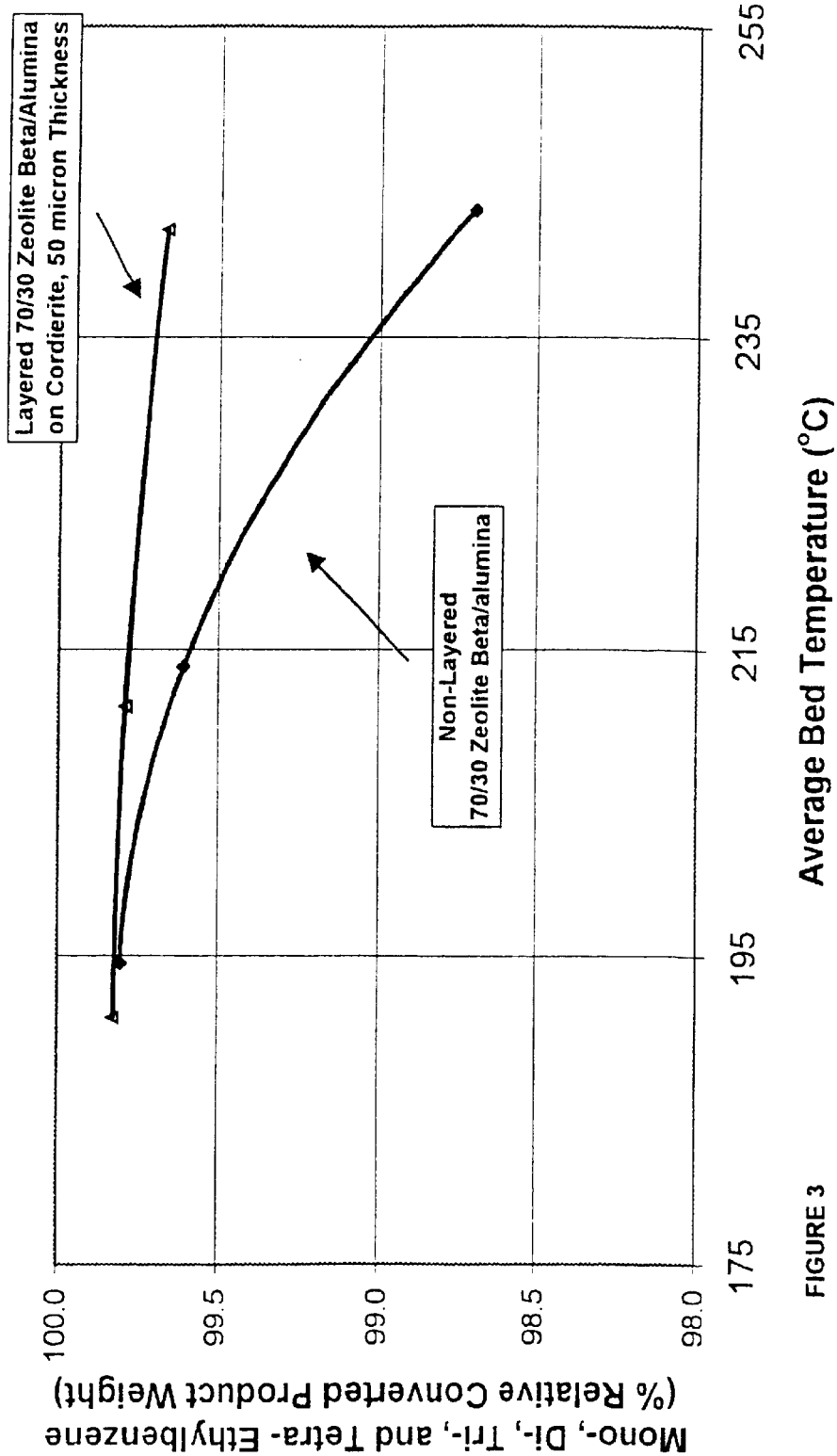
FIG. 3 shows the improvement in selectivity to desired alkylated aromatics resulting from using the layered catalyst composition of the present invention.

The layered catalyst composition and testing procedure described in Example 3 were also used to evaluate other process parameters for comparison with uniform zeolitic alkylation catalysts of the prior art. Specifically, the molar ratio of benzene to ethylene in the charge stock was varied and the effect of this parameter on the selectivity to alkylated aromatics was determined. Throughout the test, essentially complete conversion of the ethylene was maintained. The reactor effluent was analyzed by gas chromatography to determine the selectivity to desired alkylated products (i.e. ethylbenzene, diethylbenzene, triethylbenzene, and tetraethylbenzene) at various feed benzene/ethylene molar feed ratios. As shown in FIG. 3, the layered composition of the present invention provided a selectivity of at least about 99% in each case.

EXAMPLE 7

A prior art commercial catalyst was used in the pilot-scale benzene alkylation process described in Example 3 to determine the selectivity to desired alkylated aromatics. The same testing procedure and process conditions were used as in Example 6. The catalyst was in this case not a layered composition but rather comprised uniformly mixed zeolite beta and binder in a ratio of approximately 70/30 by weight. The selectivity of this conventional catalyst was inferior to that of the layered material of the present invention, as determined in Example 6. A comparison of selectivity results for each catalyst at various benzene/ethylene molar feed ratios is given in FIG. 3.

EXAMPLE 8

Figure 4:
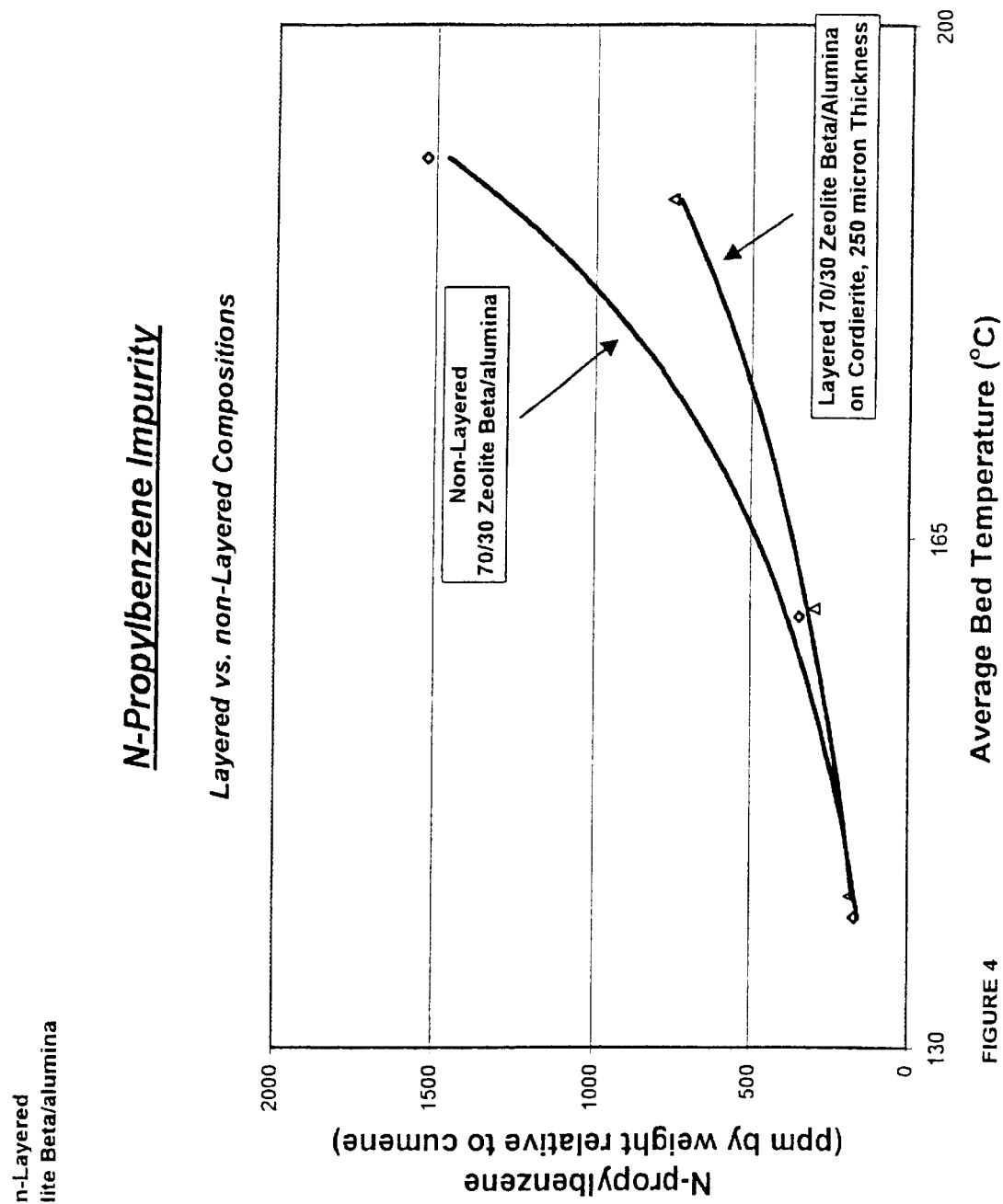
FIG. 4 shows the reduction in n-propylbenzene associated with the use of a layered catalyst of the present invention.

The layered catalyst composition and testing procedure described in Example 3 were used for performance evaluation in the alkylation of benzene with propylene to produce cumene. Specifically, samples of the reactor effluent at various average catalyst bed temperatures were analyzed using gas chromatography to determine the concentration of n-propylbenzene therein. As explained previously, n-propylbenzene is problematic in the downstream processing of cumene product streams. The relationship between the n-propylbenzene concentration in the alkylated aromatic product and average reactor temperature is depicted in FIG. 4.

EXAMPLE 9

A prior art commercial catalyst was used in the pilot-scale propylene alkylation process described in Example 8 to determine the concentration of n-propylbenzene in the alkylated aromatic product. The same testing procedure and process conditions were used as in Example 8. The catalyst was in this case not a layered composition but rather comprised uniformly mixed zeolite beta and binder in a ratio of approximately 70/30 by weight. This conventional catalyst was found to produce relatively more n-propylbenzene byproduct than that generated by the layered material of the present invention, as determined in Example 8. A comparison of the two catalysts, in terms of n-propylbenzene concentration levels in the reactor effluent as a function of average reactor temperature, is given in FIG. 4.

What is claimed is:

1. A process for preparing a layered catalyst composition comprising an inner core, an outer layer bonded to the inner core, the outer layer bonded to the inner core such that the attrition loss is less than 25% of the weight of the outer layer, and the outer layer comprising a zeolite and a binder, the process comprising:
    a) coating the inner core with a slurry comprising the zeolite, a sol of the binder, and an organic bonding agent to yield a coated core having the outer layer;
    b) drying the coated core at a temperature from about 50° C. to about 300° C. to yield a dried coated core; and,
    c) calcining the dried coated core at a temperature from about 400° C. to about 900° C. for a time sufficient to bond the outer layer to the inner core and provide the layered catalyst composition.

2. The process of claim 1 where the zeolite is selected from the group consisting of beta, zeolite Y, zeolite X, zeolite L, ferrierite, MFI, mordenite, and erionite.

3. The process of claim 1 where the binder is an inorganic metal oxide selected from the group consisting of alumina, silica, magnesia, titania, and zirconia.

4. The process of claim 1 where the inner core is coated with the slurry by rolling or dipping.

5. The process of claim 1 where the inner core is coated with the slurry by spraying the slurry onto a fixed fluidized bed of core particles.

6. The process of claim 1 where the bonding agent is selected from the group consisting of polyvinyl alcohol, hydroxy propyl cellulose, methyl cellulose, and carboxy methyl cellulose.

7. The process of claim 1 where the sol of the binder is a sol of a metal selected from the group consisting of aluminum, silicon, magnesium, titanium, and zirconium.

8. The process of claim 1 where the inner core is selected from the group consisting of cordierite, alpha alumina, theta alumina, magnesia, silicon carbide, metals, zirconia, titania, and mixtures thereof.

9. The process of claim 8 where the inner core is cordierite.

10. The process of claim 1 where the inner core has an effective diameter from about 0.05 mm to about 5 mm.

11. The process of claim 1 where the outer layer has a thickness from about 10 to about 400 microns.

12. The product of the process of claim 1.

* * * * *